United States Patent [19]

Roberts et al.

[11] Patent Number: 5,727,644

[45] Date of Patent: Mar. 17, 1998

[54] PARALLEL-ALIGNED ALL-WHEEL STEERED VEHICLE II

[76] Inventors: Brock F. Roberts, 8829 4th St. NW., Albuquerque, N. Mex. 87114; Tor P. Roberts, 228 Rio Grande Blvd. SW., Albuquerque, N. Mex. 87104

[21] Appl. No.: 503,102

[22] Filed: Jul. 17, 1995

[51] Int. Cl.⁶ ............................................ B62D 7/14
[52] U.S. Cl. ..................... 180/409; 180/89.13; 280/99; 280/91.1
[58] Field of Search ..................... 280/91.1, 99, 98, 280/101; 180/89.13, 212, 327, 9.23, 409

[56] References Cited

U.S. PATENT DOCUMENTS 4,664,213  5/1987  Lin .
5,139,279  8/1992  Roberts .

Primary Examiner—Brian L. Johnson
Assistant Examiner—Gary Savitt

[57] ABSTRACT

An all-wheel steered vehicle in which all wheels are always parallel and have an equal role in steering the vehicle. It consists of a plurality of wheel assemblies capable of wheel rotation about the wheel's axis. The shaft of each wheel assembly (14) passes through bearings (16) such that the shaft is fastened to the chassis (15) but rotatable in its vertical axis. These wheel assemblies are attached to a common steering linkage (18) by lever arms(17). The steering linkage maintains the wheels in parallel, but allow the wheel assemblies to rotate simultaneously about their vertical axis. The vehicle body or seat (23) is rotatable about the center of the chassis. The vehicle body or seat is in linkage with the wheel assemblies such that a rotation of vehicle body or seat relative to the chassis causes a simultaneous and equal rotation of all the wheel assemblies about their vertical axis. That is, both the vehicle body or seat and all of the wheels are maintained parallel to one another. The steering mechanism is such that initiating a turn with the steering control (24), rotates the vehicle body or seat with respect to the chassis and simultaneously rotates all the wheels on their vertical axes, changing the direction of the vehicle. All wheels have an equal role in steering the vehicle.

2 Claims, 3 Drawing Sheets

PARALLEL-ALIGNED ALL-WHEEL STEERED VEHICLE II

BACKGROUND-FIELD OF INVENTION

This invention relates to all wheel steered vehicles.

BACKGROUND-DESCRIPTION OF PRIOR ART

Almost all wheeled vehicle designs descend from a common predecessor, that is a rectangular chassis with four wheels that are essentially in line with the opposing sides of the rectangle. Although there have been many variations on this design to improve steering, all are lacking in at least some of the following ways:

- (a) All wheels do not play an equal role in steering the vehicle. When a vehicle turns, the force required to change the vehicle's direction is essentially distributed on the steering wheels. It would be a benefit if all the wheels of the vehicle played an equal part in steering. The force would then be shared by all the wheels, maximizing traction.
- (b) Each wheel rotates at different rates unless the vehicle is moving in a straight line. When most vehicles negotiate a turn, the wheels on the inside of the turn rotate at a slower rate the outside wheels. If all wheels rotated the same rate at all times, drive and braking designs could be simplified and the stability of the vehicle in turns could be increased.
- (c) Existing vehicle designs require a cumbersome turning radius. It would be beneficial in many applications to be able to turn the vehicle within its own footprint.
- (d) When a vehicle negotiates a turn, the entire mass of the vehicle must rotate about the vehicle's vertical axis. The force that rotates it, required by the vehicles moment of inertia is transferred from the tires traction. If only the essential components of the vehicle rotated through a turn, its effective moment of inertia would decrease, improving cornering.
- (e) Most steering systems require the operator to steer the vehicle in the initial part of a turn, then return the steering system to its forward position when the turn is complete. In many applications it would be a benefit if the steering system did not need to be returned after the turn has been negotiated.

OBJECTS AND ADVANTAGES

Accordingly several objects and advantages of this invention are:

- (a) To provide a vehicle in which all wheels play an equal role in steering by creating a system where all the wheels of the vehicle steer, and all are always parallel to one another. The entire weight of the vehicle rests on primary steering wheels. Depending on the weight distribution of the vehicle, each wheel equally applies traction to change the direction of the vehicle. This design increases traction, stability, responsiveness, and improves safety and performance.
- (b) To provide a vehicle in which all wheels rotate at the same rate independent of the path negotiated. This not only simplifies the drive and braking systems, but also increases the vehicle's stability in turns, especially during acceleration or braking, improving safety and performance.
- (c) To provide a vehicle which has the ability to turn within its own footprint. This improves maneuverability substantially is very beneficial in many situations and applications.
- (d) To provide a vehicle in which only the essential components rotate when it rounds a turn. By creating a vehicle whose chassis is directionally constant throughout a turn, the vehicle's effective moment of inertia is decreased. This decreases the amount of force required to change the vehicles direction, allowing more of the frictional force between the wheels and ground to be used in increasing the vehicle's cornering ability.
- (e) To provide a steering system where the operator steers during the turn, but does not return the steering at the completion of the turn.

Further objects and advantages of the invention will become apparent from a consideration of the drawings and ensuing description.

DRAWING FIGURES

REFERENCE NUMERALS IN DRAWINGS

| | |
|---|---|
| 10 WHEEL | 18 STEERING LINKAGE |
| 11 AXLE | 19 STEERING MOTOR |
| 12 SUPPORT BAR OR FORK | 20 STEERING LINKAGE GLIDE |
| 13 DRIVE MOTOR | 21 BEARING PIN |
| 14 SHAFT | 22 CENTRAL SHAFT |
| 15 CHASSIS | 23 VEHICLE BODY OR SEAT |
| 16 BEARINGS | 24 STEERING AND DRIVE CONTROLS |
| 17 LEVER ARM | |

DETAILED DESCRIPTION OF THE EMBODIMENT ILLUSTRATED

Figure 1:
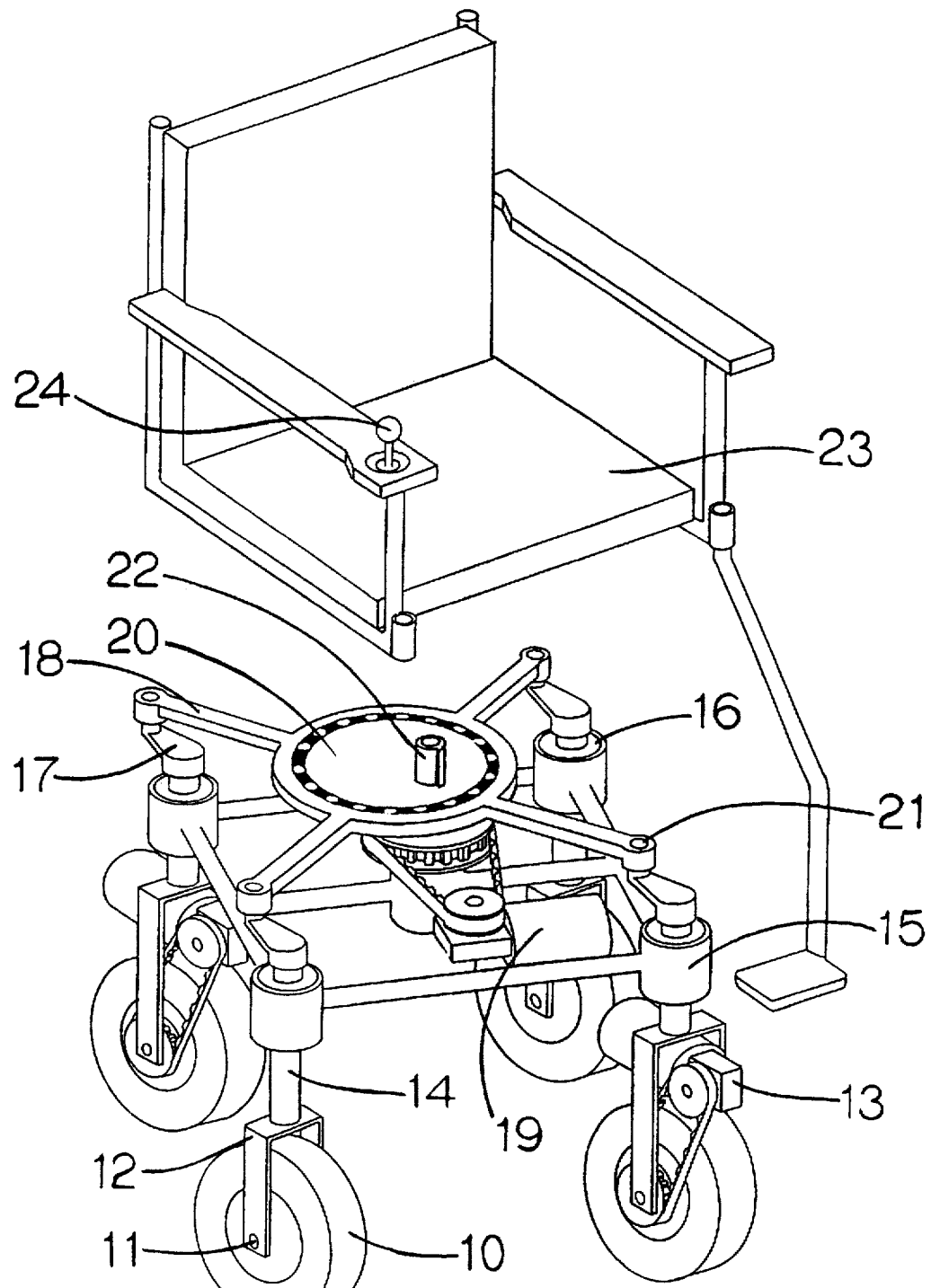
FIG. 1 is a perspective, exploded view of the invention.

FIG. 1. shows a perspective, exploded view of a typical embodiment of the present invention. Each wheel (10) is supported by its axle (11) to a vertically rotatable shaft (14) by a support bar or fork (12). The drive wheels are engaged to drive motors (13) which are attached to their support bar or fork (12). The wheel (10), axle (11), support bar or fork (12) and shaft (14) are together referred to as a wheel assembly. The shaft (14) of each wheel assembly passes, through the beatings (16) such that the shaft (14) is fastened to the chassis (15) but rotatable in its vertical axis. The top of the rotatable shaft (14) is connected to a lever arm (17). This lever arm (17) is perpendicular to the shaft (14) and is in the same vertical plane as the wheel (10). With each wheel (10) parallel to one another, the lever arms (17) are all attached to the steering linkage (18) by the bearing pin (21). The steering linkage (18) maintains the wheel assemblies parallel, to one another but allows simultaneous rotation of the wheel assemblies.

The central shaft (22) passes through bearings (16) a bearing which and is similarly attached to the chassis (15), such that the central shaft is rotatable in its vertical axis. The steering linkage (18) is shaped with a circular ring concentric with the linkage's center. Attached to the central shaft (22) is a steering linkage glide (20) equipped with rollers or bearings that engage the steering linkage's ring. Because the center of the steering linkage's ring is offset from the central shaft (22) (by the length of the lever arms (17), rotation of the central shaft (22) causes displacement of the steering linkage (18) and simultaneous rotation of the wheel assemblies.

The steering motor (19) is attached to the chassis (15) and engaged to the central shaft (22). Thus the action of the steering motor (19) causes each wheel assembly and the central shaft (22) to rotate in unison, in the same direction and at equal angles. The wheels (10) are always parallel to one another.

The vehicle body or seat (21) is attached to the central shaft (22) so that it is aligned parallel to the wheels (10), and rotates with the central shaft. (22). The steering and drive controls (24) on the vehicle body or seat (23) direct the action of the steering and drive motors through rotatable connections through the central and wheel assembly shafts. Thus when the operator commands a turn, the steering motors (19) action rotates the vehicle body or seat (23), and each wheel assembly in unison, in the same direction and at equal angles, always maintaining them in parallel. Activating the drive motors (13) moves the vehicle forwards and backwards in a straight line, or, if activated in conjunction with the steering motor (19), in a curve.

Figure 2:
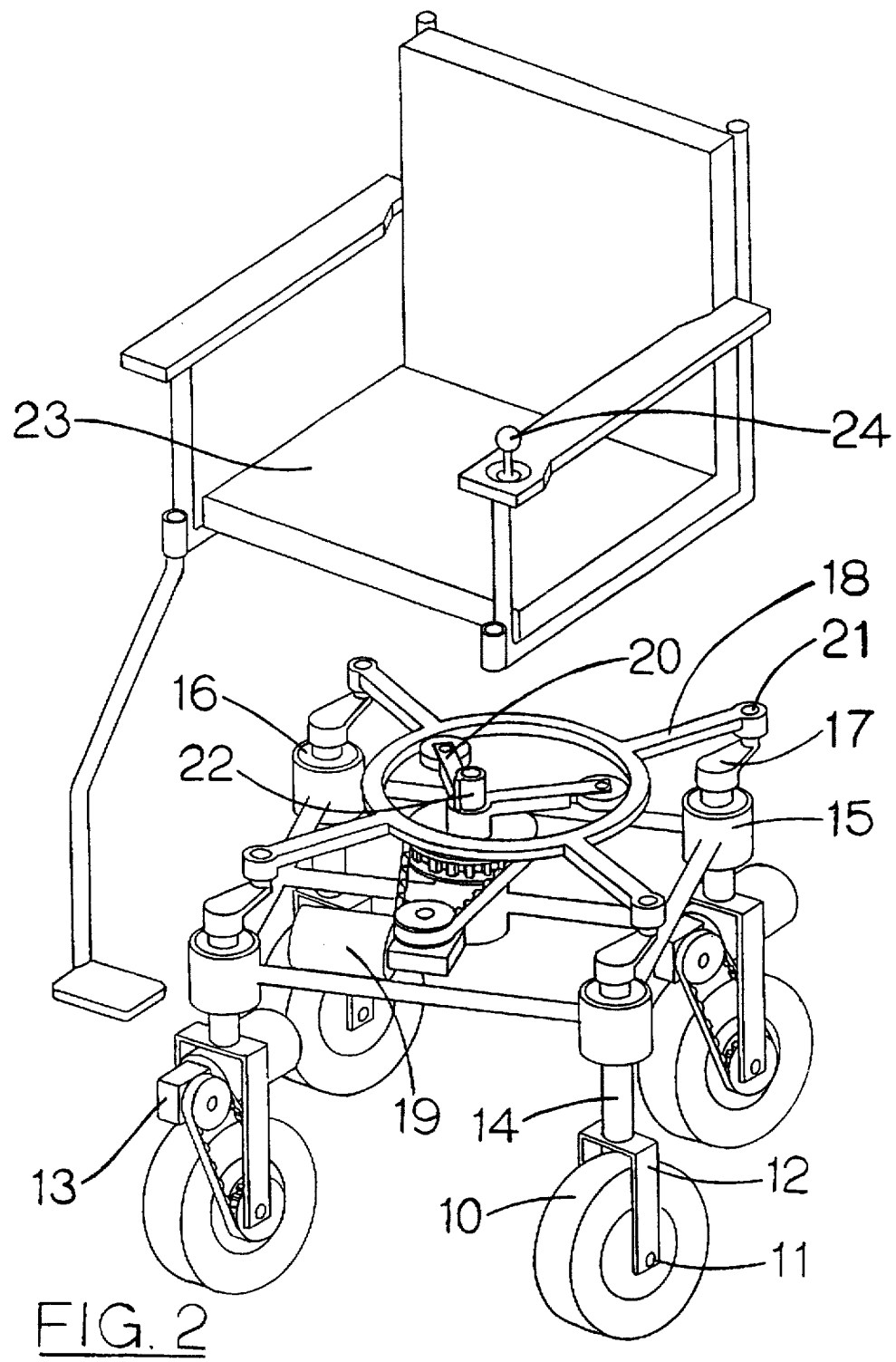
FIG. 2 shows the invention with an alternative steering linkage glide.

FIG. 2 shows a similar steering mechanism where the steering linkage glide (20) has rollers which engage the linkage ring.

Figure 3:
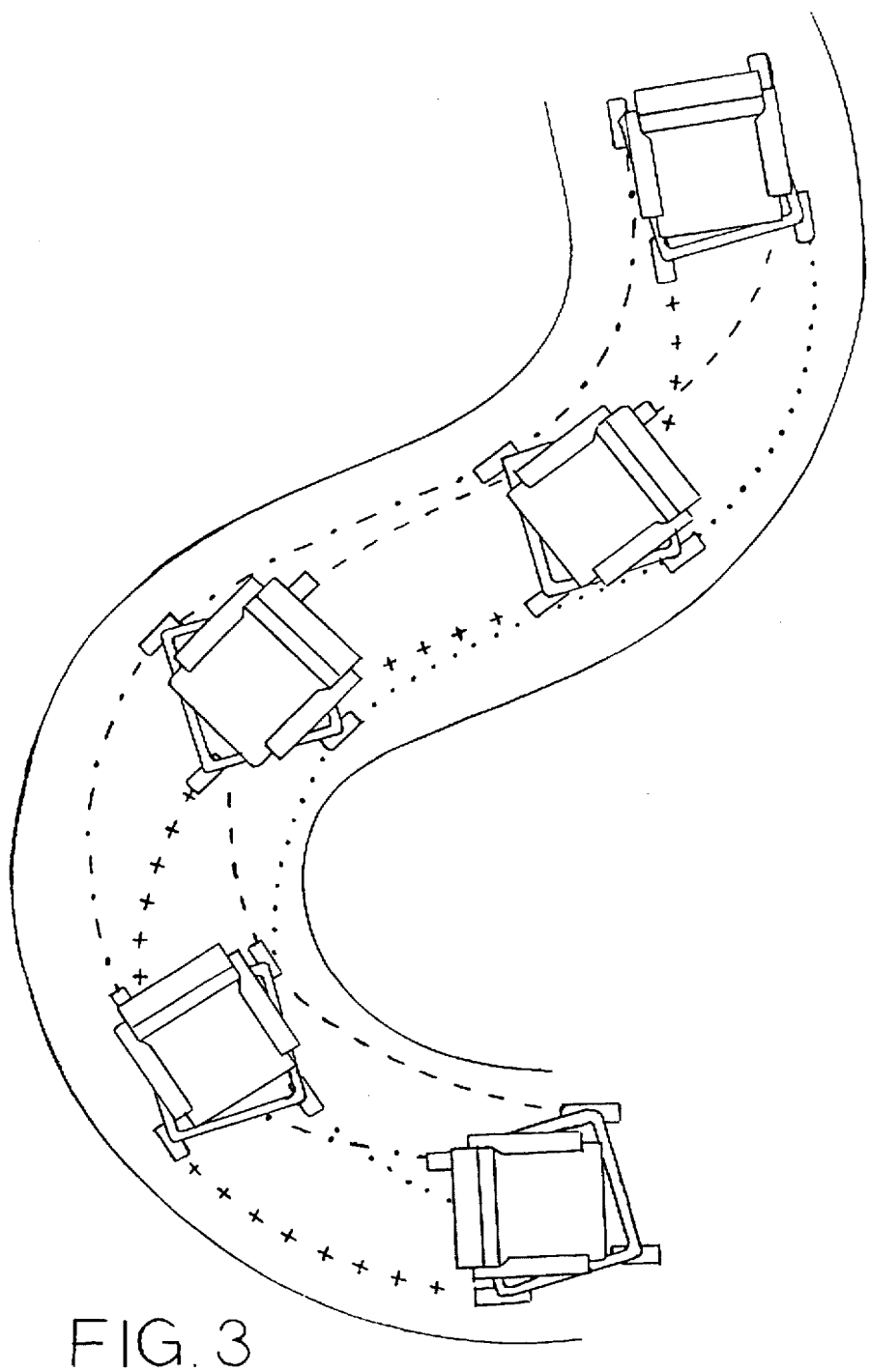
FIG. 3 illustrates how the vehicle's wheels track around a curve.

FIG. 3 shows the vehicles tracks as it rounds a curve.

SUMMARY, RAMIFICATIONS AND SCOPE

In the vehicle described above, the body and wheels always point in the direction of motion. This direction of motion is changed by steering the vehicle which simultaneously changes the direction of all the wheels and the body. Thus, all wheels equally share the role of steering the vehicle in that they are always parallel and that they apply traction equally to steer the vehicle. Because the chassis remains directionally constant and the wheels remain parallel to one another, turning appropriately to change the direction of the vehicle, the wheels each roll out equal arcs, traveling at the same rate.

The described vehicle has the ability to turn within its own footprint, that is if the operator turns the steering wheel, she can rotate to face any direction.

Because the body or seat is always parallel to the wheels, and steering the vehicle simultaneously changes the direction of the body or seat with the wheels, directional response is virtually immediate. The vehicle is highly responsive to the operator.

Because the chassis is directionally constant, the effective moment of inertia of the vehicle is decreased, decreasing the amount of force required to change the vehicle's direction, improving cornering.

As the vehicle goes through a turn the operator simultaneously changes the direction of the body or seat, and the wheels. At the completion of the turn the operator does not need to return the steering system to the straight ahead position. Because the wheels are parallel to one another, the vehicle is essentially always in position to move straight, even at the completion of a turn.

While the above description contains many specificities, these should not be construed as limitations on the scope of the invention, but rather as an exemplification of embodiments thereof.

For example, the wheel assemblies should be equipped with drive, breaking and suspension appropriate for the application of the vehicle. The drive system could consist of one or more wheel motors, or a central engine with appropriate linkage to the wheels. In the case of an electric vehicle, the batteries could be attached to either the chassis or the body with appropriate rotatable connections from the controls to the chassis, and for power to the wheel motors. Hydraulic drive would be similar with rotatable connections to wheel motors. The body could be enclosed or open. The size of the vehicle could be small or large. The steering linkage could be a variety of shapes. The steering could be motorized or manual. The wheel assemblies could be adapted to have caster or camber if needed. Applications of this vehicle could vary for wheel chairs, automobile, fork lifts etc.

Accordingly, the scope of the invention should be determined not by the embodiment illustrated, but by the appended claims and their legal equivalents.

We claim:

1. An all-wheel steered vehicle, comprising:

a) a chassis;

b) a plurality of wheel assemblies, each wheel assembly having a shaft mounted for rotation on the chassis, support means attached to the shaft for mounting an axle, a wheel mounted for rotation on the axle, and a lever arm attached to the shaft and extending to a free end spaced from said shaft;

c) a steering linkage having a ring and a plurality of arms each having one end fixedly attached to the ring and the other end extending from the ring to a point where it is pivotally connected to one of said lever arm free ends, the lever arms when so connected being disposed such that all of the axles are parallel to one another, the steering linkage ring defining a first axis;

d) steering means having a rotatable central shaft extending through the steering linkage ring to define a second axis offset from the first axis, a glide member attached to the central shaft mounted on the chassis so as to rotate therewith about said second axis, the glide member being slidingly engageable with the steering linkage ring and rotatable with respect thereto, such that activation of the steering means causes the linkage ring to rotate the lever arms simultaneously and equally with respect to the chassis.

2. The all-wheel steered vehicle in claim 1 wherein:

a) the shafts of each wheel assembly are vertical;

b) the axles of each wheel assembly are horizontal;

c) the first axis and the second axis are vertical;

d) the steering linkage ring is circular; and e) the vertical shafts of each wheel assembly are mounted to the chassis and define a first circle equal in size to a second circle defined by the free ends of the lever arms when said lever arms are all parallel, the second axis being at the center of this second circle.

* * * * *